(12) United States Patent
Schaffer et al.

(10) Patent No.: US 9,421,505 B2
(45) Date of Patent: Aug. 23, 2016

(54) TURBULENT FLOW DEVICES AND METHODS OF USE

(71) Applicants: Benjamin Joseph Schaffer, Rogers, MN (US); Thomas Raymond Schaffer, Delano, MN (US); Richard Thomas Schaffer, Delano, MN (US); David R. Knighton, Richmond, MN (US); Vance D. Fiegel, Shakopee, MN (US)

(72) Inventors: Benjamin Joseph Schaffer, Rogers, MN (US); Thomas Raymond Schaffer, Delano, MN (US); Richard Thomas Schaffer, Delano, MN (US); David R. Knighton, Richmond, MN (US); Vance D. Fiegel, Shakopee, MN (US)

(73) Assignee: Creative Water Solutions, LLC, Plymouth, MN (US)

( * ) Notice: Subject to any disclaimer, the term of this patent is extended or adjusted under 35 U.S.C. 154(b) by 16 days.

(21) Appl. No.: 14/202,181

(22) Filed: Mar. 10, 2014

(65) Prior Publication Data

US 2014/0251898 A1    Sep. 11, 2014

Related U.S. Application Data

(60) Provisional application No. 61/775,889, filed on Mar. 11, 2013.

(51) Int. Cl.
*B01F 3/12* (2006.01)
*C02F 3/32* (2006.01)
*B01F 5/02* (2006.01)
(Continued)

(52) U.S. Cl.
CPC .............. *B01F 3/12* (2013.01); *B01F 5/0206* (2013.01); *B01F 15/00915* (2013.01); *C02F 1/286* (2013.01); *C02F 3/32* (2013.01); *C02F 2301/024* (2013.01); *C02F 2303/16* (2013.01); *Y10T 137/0318* (2015.04); *Y10T 137/206* (2015.04)

(58) Field of Classification Search
CPC .... C02F 1/286; C02F 3/32; C02F 2301/024; C02F 2303/16; Y10T 137/0318; Y10T 137/206; B01F 5/0206; B01F 15/00915; B01F 3/12
USPC ........ 210/602, 167.1, 167.11, 167.12, 167.13
See application file for complete search history.

(56) References Cited

U.S. PATENT DOCUMENTS

| 2,278,488 A | 4/1942 | Ralston |
| 2,322,087 A | 6/1943 | Atwood |
| 2,603,460 A | 7/1952 | Kalinske |

(Continued)

FOREIGN PATENT DOCUMENTS

| CN | 202446914 U | 9/2012 |
| EP | 2 327 666 A1 | 6/2011 |

(Continued)

OTHER PUBLICATIONS

Abstract for CN 202446914 U (1 page). Printed on Mar. 24, 2014.

(Continued)

*Primary Examiner* — Fred Prince
(74) *Attorney, Agent, or Firm* — Popovich, Wiles & O'Connell, P.A.

(57) ABSTRACT

A device for creating turbulent flow in a fluid including a tank having an inlet, an outlet, and an interior; at least one jet in an inflow assembly in the interior of the tank, the jet being in fluid communication with the inlet, the jet circulating fluid in the tank; a plurality of holes in an outflow assembly in the interior of the tank, the plurality of holes being in fluid communication with the outlet; and a deflector positioned to circulate the bulk of the fluid away from the plurality of holes. Methods of using the device are also provided.

9 Claims, 13 Drawing Sheets

(51) Int. Cl.
*B01F 15/00* (2006.01)
*C02F 1/28* (2006.01)

(56) References Cited

U.S. PATENT DOCUMENTS

| | | | |
|---|---|---|---|
| 3,905,890 A * | 9/1975 | Minegishi | C02F 1/463 |
| | | | 204/273 |
| 4,005,010 A | 1/1977 | Lunt | |
| 4,164,541 A | 8/1979 | Platz et al. | |
| 5,538,629 A | 7/1996 | Blaney et al. | |
| 5,543,039 A | 8/1996 | Odegaard | |
| 5,562,114 A * | 10/1996 | St. Martin | A47J 43/24 |
| | | | 134/111 |
| 6,036,851 A | 3/2000 | Simmering et al. | |
| 6,080,304 A | 6/2000 | Gomi | |
| 6,383,383 B1 | 5/2002 | Novak | |
| 6,447,675 B1 | 9/2002 | James | |
| 6,709,574 B2 | 3/2004 | James | |
| 7,329,350 B2 | 2/2008 | James | |
| 7,378,019 B1 | 5/2008 | Currier et al. | |
| 7,468,134 B2 | 12/2008 | Hoang | |
| 7,497,947 B2 | 3/2009 | Knighton et al. | |
| 7,833,418 B1 | 11/2010 | Warren | |
| 8,142,651 B1 | 3/2012 | Chernoff | |
| 2006/0032124 A1 * | 2/2006 | Knighton | A01N 65/00 |
| | | | 47/59 R |
| 2007/0264704 A1 | 11/2007 | Van Toever | |
| 2010/0200069 A1 * | 8/2010 | Glomset | A01K 61/00 |
| | | | 137/1 |
| 2012/0152828 A1 | 6/2012 | Fiegel et al. | |
| 2012/0248037 A1 | 10/2012 | Knighton et al. | |
| 2013/0140239 A1 | 6/2013 | Knighton et al. | |

FOREIGN PATENT DOCUMENTS

| | | |
|---|---|---|
| FR | 1 104 630 A | 11/1955 |
| FR | 2 776 942 A1 | 10/1999 |
| KR | 1020090050343 A | 5/2009 |
| KR | 10-0934038 B1 | 12/2009 |

OTHER PUBLICATIONS

Abstract for KR 10-0934038 B1 (1 page). Publication Date Unknown.
English Translation for CN 202446914 U (5 pages). Publication Date Unknown.
English Translation for KR 10-0934038 B1 (17 pages). Publication Date Unkown.
English Translation for KR1020090050343A (9 pages). Publication Date Unknown.
Aug. 4, 2014 PCT International Search Report and Written Opinion for Application No. PCT/US2014/022357 (15 pages).

* cited by examiner

TURBULENT FLOW DEVICES AND METHODS OF USE

This application claims priority of U.S. Provisional Application No. 61/775,889, filed Mar. 11, 2013, entitled "Turbulent Flow Devices and Methods of Use", the contents of which are hereby incorporated by reference.

FIELD OF THE INVENTION

This invention relates to devices for increasing turbulent flow in a fluid and methods of using such devices. In particular, the invention relates to increasing turbulent flow in a fluid to maximize contact between material such as Sphagnum moss leaves contained in a mesh bag and preventing the bag from occluding outflow from the device.

BACKGROUND OF THE INVENTION

There have been earlier devices used to treat water that involved increasing the contact between the water treatment substances and the water. See, for example, U.S. Pat. No. 6,080,304, which describes a clarifying device for use in an aquarium.

Sphagnum moss has been used to treat water. Previous studies have demonstrated that Sphagnum moss significantly inhibits the growth of free-floating (planktonic) bacteria. See U.S. Pat. No. 7,497,947 B2 and U.S. Patent Application Publication No. 2006/0032124 A1, both of which are incorporated by reference herein. Other studies have demonstrated that Sphagnum moss inhibits and removes biofilm (U.S. Patent Application Publication No. 2012/0152828 A1) and that moss can be used to reduce disinfection by-products in water treated with disinfectants (U.S. Patent Application Publication No. 2013/0140239 A1). "Sphagnum moss" is a generic expression that designates a range of botanical species that co-exist in a sphagnous bog. It should be noted that "peat moss" refers generally to a decomposed or composted Sphagnum moss such as that found in a bog containing Sphagnum moss. Sphagnum moss is commonly harvested for use in various products. The petals, and not the stems, of the moss preferably may be harvested. Typically large pieces of plant material (roots, twigs, etc.) are removed. Excess water is removed and the moss is air dried. The moss may be compressed prior to packaging or shipment. The dried and compressed Sphagnum moss petals preferably are contained in a fine mesh bag that allows flow of water in and out of the bag but contains the petals within the bag. Various additives may be used to alter the absorption characteristics or mechanical properties of the moss. Because Sphagnum moss is readily available and relatively inexpensive, it has been used in a variety of products, primarily for the absorption of fluids.

There is need in the art for devices and methods of increasing turbulent flow in a fluid, particularly for contacting water treatment substances with water to improve the efficiency of the water treatment substances such as water.

SUMMARY OF THE INVENTION

The invention provides a device for creating turbulent flow in a fluid comprising: a tank having an inlet, an outlet, and an interior; at least one jet in an inflow assembly in the interior of the tank, the jet being in fluid communication with the inlet, the jet circulating fluid in the tank; a plurality of holes in an outflow assembly in the interior of the tank, the plurality of holes being in fluid communication with the outlet; and a deflector positioned to circulate the bulk of the fluid away from the plurality of holes.

The invention provides a method of producing turbulence in a fluid comprising: providing the device of the preceding paragraph, pumping fluid into the inlet, and allowing fluid to flow out the outlet.

The invention provides a method of contacting moss with water comprising: providing the device described two paragraphs above, placing moss in the interior of the tank, pumping water into the inlet, and allowing water to flow out the outlet.

The invention provides a method of contacting a solid material with a fluid comprising: providing the device described three paragraphs above, placing the solid material in the interior of the tank, introducing the fluid into the inlet, and allowing the fluid to flow out the outlet.

It is to be understood that both the foregoing general description and the following detailed description are exemplary and explanatory and are intended to provide further explanation of the invention as claimed.

DETAILED DESCRIPTION OF THE PREFERRED EMBODIMENTS

The invention provides a device for creating turbulent flow in a fluid comprising: a tank having an inlet, an outlet, and an interior; at least one jet in an inflow assembly in the interior of the tank, the jet being in fluid communication with the inlet, the jet circulating fluid in the tank; a plurality of holes in an outflow assembly in the interior of the tank, the plurality of holes being in fluid communication with the outlet; and a deflector positioned to circulate the bulk of the fluid away from the plurality of holes. Throughout this application, including the claims, a "jet" is any structure from which fluid flows out at a rapid speed. Throughout this application, including the claims, "turbulent flow" merely means agitated water and not the more technical definition from fluid dynamics.

In one embodiment, the inflow assembly comprises a first jet and a second jet. In an embodiment, the first and second jets are oriented at a right angle to each other. In an embodiment, the tank has a top portion and a side portion and the first jet is pointed at the top portion and the second jet is pointed at the side portion. In an embodiment, the inlet is positioned above the outlet. In one embodiment, the deflector is attached to the outflow assembly. In an embodiment, the deflector is a curved rectangular sheet. In one embodiment, the deflector has dimensions of from 8 to 16 inches (20 to 41 cm) by 8 to 16 inches (20 to 41 cm) by 1/8 to 1/2 inch (0.32 to 1.3 cm). In an embodiment, the deflector is a rectangular sheet. In one embodiment, the interior of the tank has a vertical height and wherein the plurality of holes are located near the midpoint of the vertical height of the interior of the tank. In an embodiment, the deflector is near and in front of the plurality of holes. In an embodiment, the inflow assembly comprises exactly two jets. In one embodiment, the inflow assembly comprises exactly three jets. In an embodiment, the device is configured to direct the fluid in a generally clockwise or counter-clockwise direction.

The invention provides a method of producing turbulence in a fluid comprising: providing a device for creating turbulent flow in a fluid, pumping a fluid into the inlet, and allowing fluid to flow out the outlet, the device comprising a tank having an inlet, an outlet, and an interior; at least one jet in an inflow assembly in the interior of the tank, the jet being in fluid communication with the inlet, the jet circulating fluid in the tank; a plurality of holes in an outflow assembly in the interior of the tank, the plurality of holes being in fluid communication with the outlet; and a deflector positioned to circulate the bulk of the fluid away from the plurality of holes. In an embodiment, the fluid is water.

The invention provides a method of contacting moss with water comprising: providing a device for creating turbulent flow in a fluid, placing moss in the interior of the tank, pumping water into the inlet, and allowing water to flow out the outlet, the device comprising a tank having an inlet, an outlet, and an interior; at least one jet in an inflow assembly in the interior of the tank, the jet being in fluid communication with the inlet, the jet circulating fluid in the tank; a plurality of holes in an outflow assembly in the interior of the tank, the plurality of holes being in fluid communication with the outlet; and a deflector positioned to circulate the bulk of the fluid away from the plurality of holes. In one embodiment, water is pumped into the inlet at a rate of 15 to 35 gallons (57 to 132 liters) per minute. In an embodiment, the tank has a volume of 50 to 100 gallons (190 to 380 liters). The tank could have any volume large enough to allow flow of fluid from one pint to hundreds or thousands of gallons.

In one embodiment, the moss is in one or more mesh bags. The mesh bags need to have spaces in the mesh small enough to contain particles of moss and large enough to allow free passage of water within the bag. In an embodiment, the inlet assembly comprises a first jet and a second jet. In an embodiment, the first and second jets are oriented at a right angle to each other. In an embodiment, the tank has a top portion and a side portion and the first jet is pointed at the top portion and the second jet is pointed at the side portion. In an embodiment, the inlet is positioned above the outlet. In one embodiment, the deflector is attached to the outlet assembly. In an embodiment, the deflector is near and in front of the plurality of holes. In one embodiment, the moss is regenerated by flowing an acidic or salt solution through the device. In an embodiment, the inflow assembly comprises exactly two jets. In one embodiment, the inflow assembly comprises exactly three jets. In an embodiment, the device is configured to direct the fluid in a generally clockwise or counter-clockwise direction.

The invention provides a method of contacting a solid material with a fluid comprising: providing a device for creating turbulent flow, placing the solid material in the interior of the tank, introducing the fluid into the inlet, and allowing the fluid to flow out the outlet, the device comprising a tank having an inlet, an outlet, and an interior; at least one jet in an inflow assembly in the interior of the tank, the jet being in fluid communication with the inlet, the jet circulating fluid in the tank; a plurality of holes in an outflow assembly in the interior of the tank, the plurality of holes being in fluid communication with the outlet; and a deflector positioned to circulate the bulk of the fluid away from the plurality of holes. In an embodiment, the inlet assembly comprises a first jet and a second jet. In one embodiment, the first and second jets are oriented at a right angle to each other. In an embodiment, the tank has a top portion and a side portion and the first jet is pointed at the top portion and the second jet is pointed at the side portion. In an embodiment, the inlet is positioned above the outlet. In an embodiment, the deflector is attached to the outlet assembly. In an embodiment, the deflector is near and in front of the plurality of holes.

The devices of the invention can be used to contact any fluid with any material, for example particles, spheres, leaves, petals, etc. The device maximizes the exposure of the fluid to the material to facilitate interaction of the fluid and the material and diffusion of substances out of the material into the fluid or out of the fluid into the material.

The devices of the invention can be used to expose particles, leaves, petals, etc. in one or more mesh bags to turbulent flow of a fluid in a continuous flow situation while not allowing the bags to obstruct the outflow of the device. The deflector directs the fluid flow away from the outflow holes and thereby prevents the bags and the contents of the bags from obstructing the outflow holes. In an embodiment, the jets are positioned to provide directed flow around the horizontal and vertical circumference of the vessel, across the deflector plate, and out the outlet without allowing the bags to be sucked into the outflow and thus obstructing flow.

Preferred embodiments of the invention are described with reference to the accompanying drawings.

Figure 1:
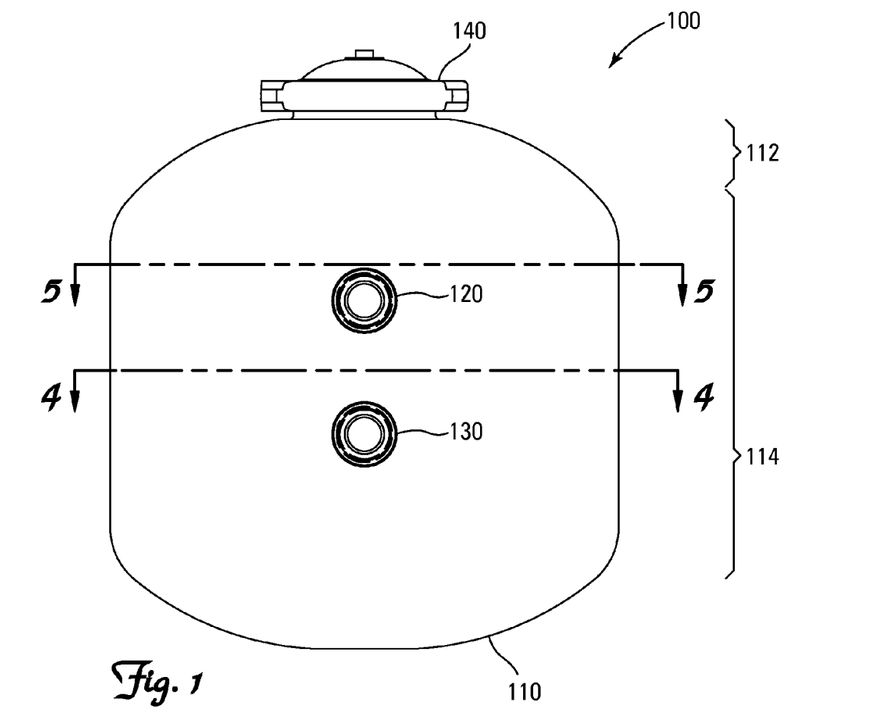
FIG. 1 is a front view of a turbulent flow device 100 of the invention.

FIG. 1 shows a turbulent flow device 100 of the invention. The device includes a tank 110, tank inlet 120, tank outlet 130, and tank cover 140. Tank 110 has a top portion 112 and a side portion 114. The tank 110 is a commercially available tank that is intended to be filled with sand and used to filter water. Suitable tanks are available from Waterco, Augusta, Ga., USA. The tank can be any size, but preferably has an interior diameter of approximately 40 inches (100 cm), 36 inches (91 cm), 30 inches (76 cm), 28 inches (71 cm), 24 inches (61 cm), or 19 inches (48 cm), and a height of approximately 30 inches (76 cm). The tank can have any volume, but preferably has a volume from 50 to 100 gallons (190 to 380 liters). The tank can be made of metal or fiberglass. The tank cover 140 includes a bleed assembly 142 that is included when the tank is purchased from Waterco. The bleed assembly 142 is used to bleed air from the tank.

Figure 2:
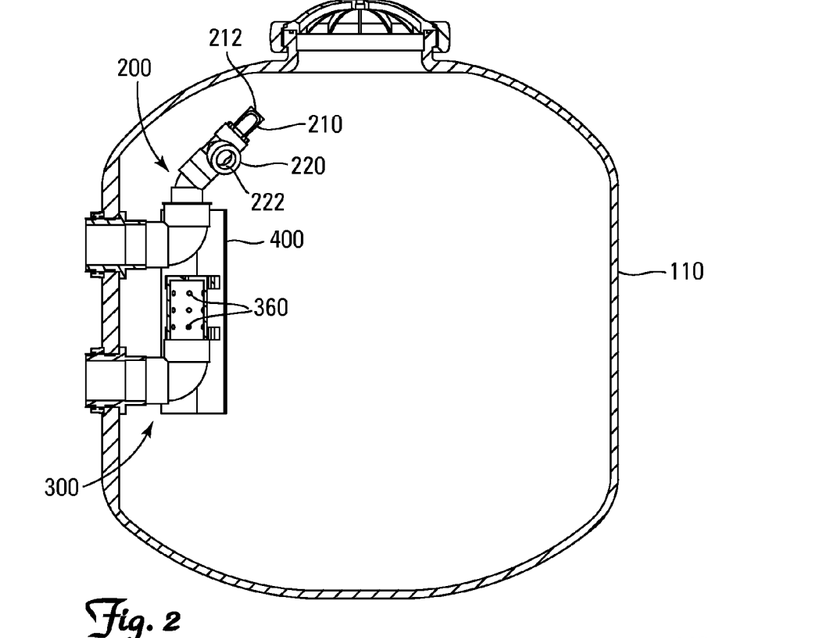
FIG. 2 is a side, cut-away view of the turbulent flow device 100 of FIG. 1.
Figure 3:
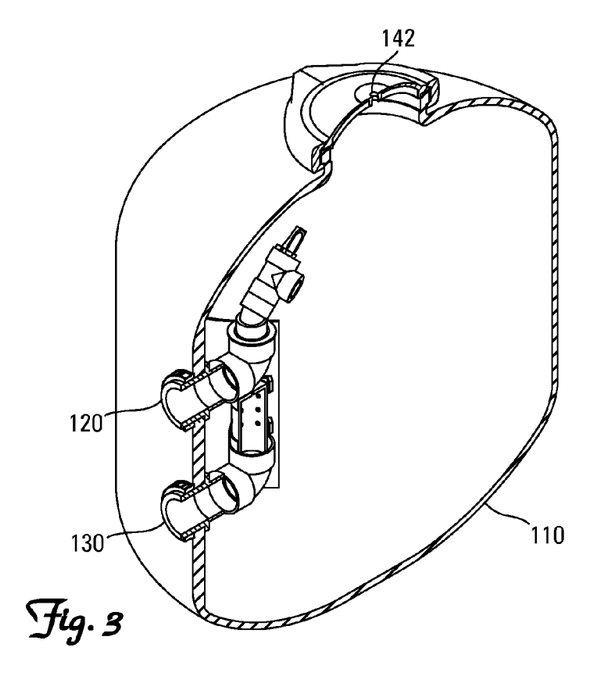
FIG. 3 is a perspective, cut-away view of the turbulent flow device 100 of FIG. 1.
Figure 4:
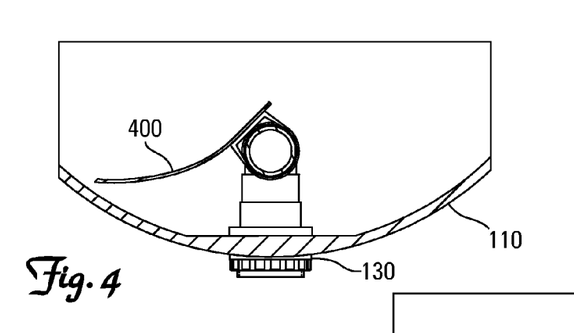
FIG. 4 is a cross-sectional view from line 4-4 of FIG. 1.
Figure 5:
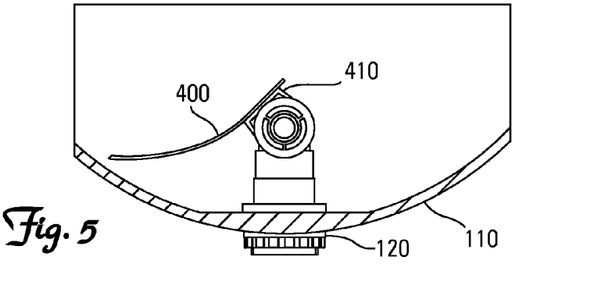
FIG. 5 is a cross-sectional view from line 5-5 of FIG. 1.

As shown in FIGS. 2 and 3, which are cut-away views of the turbulent flow device 100 of FIG. 1, inflow assembly 200 is connected to tank inlet 120 and outflow assembly 300 is attached to tank outlet 130. Deflector 400 is attached to the outflow assembly 300 by deflector connection 410. FIG. 4 is a cross-sectional view from line 4-4 of FIG. 1 and FIG. 5 is a cross-sectional view from line 5-5 of FIG. 1. The deflector 400 preferably has dimensions of from 8 to 16 inches (20 to 41 cm) by 8 to 16 inches (20 to 41 cm) by ⅛ to ½ inch (0.32 to 1.3 cm), and more preferably has dimensions of 12 inches by 12 inches by ⅛ inch (30 cm×30 cm×0.32 cm). As shown in the figures, deflector 400 is a rectangular sheet that has been curved to direct fluid past the outflow assembly 300. The deflector 400 is preferably made of a flexible plastic and the inlet and outflow assemblies are preferably made of plastic such as polyvinylchloride (PVC). The deflector 400 could have rounded edges and corners.

Figure 6:
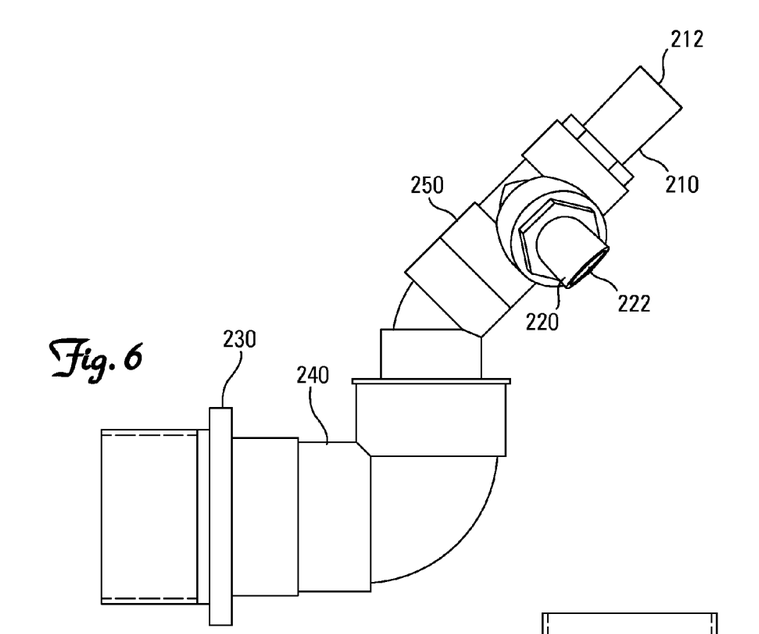
FIG. 6 is a side view of the inflow assembly 200 of the turbulent flow device 100.

The inflow assembly 200 includes a forward jet 210 and a side jet 220. The side jet 220 directs the incoming fluid in a counter-clockwise direction as viewed from the top of the tank 110 shown in FIG. 2. The forward jet 210 increases the turbulence of the fluid in the tank. The inflow assembly 200 is shown in detail in FIG. 6. The inflow assembly 200 is mounted to the tank 110 with the aid of the inlet bulkhead 230. The inflow assembly 200 can be connected to the tank 110 by adhesive or other methods. The fluid enters the inlet assembly 200 through a pipe 240 having an inside diameter of approximately 2 inches (5 cm), the inside diameter is reduced to approximately 1 inch (2.5 cm) at pipe 250, and the fluid then flows out of forward jet outlet 212 and side jet outlet 222.

Figures 7, 8:
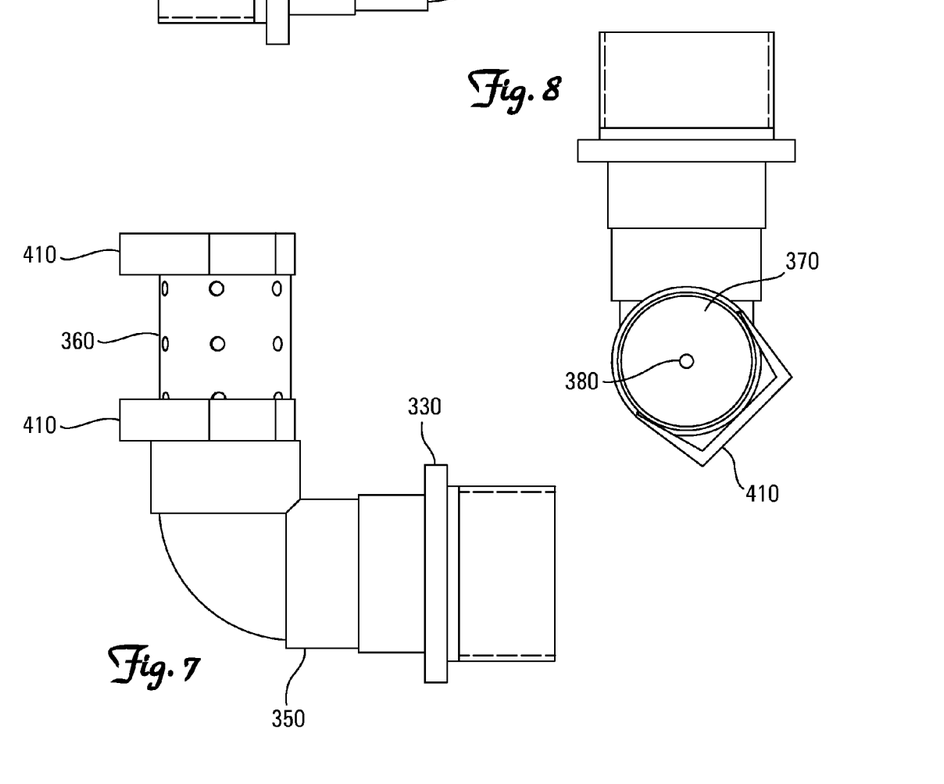
FIG. 7 is a side view of the outflow assembly 300 of the turbulent flow device 100, without the deflector 400.
FIG. 8 is a top view of the outflow assembly 300 of the turbulent flow device 100, without the deflector 400.

The outflow assembly 300, without the deflector 400 attached, is shown in FIGS. 7 and 8. The outflow assembly 300 is mounted to the tank 110 with the aid of the outlet bulkhead 330. The outflow assembly 300 can be connected to the tank 110 by adhesive or other methods. Fluid flows into the outlet assembly through holes 360 on pipe 350. Fluid also flows into the outlet assembly through hole 380 on cap 370. After fluid enters holes 360 and 380, the fluid flows through pipe 350 and out tank outlet 130. Pipe 350 has an inside diameter of approximately 2 inches (5 cm).

The deflector 400 (not shown in FIG. 7) is attached to the outflow assembly by the deflector connection 410. As shown in FIG. 7, the deflector connection has two parts, one above the inlet holes 360 and one below the inlet holes 360. The deflector can be connected to the deflector connection by bolts, rivets, adhesives, or other methods.

In use, a fluid such as water is introduced into the tank 110 through the tank inlet 120. If the fluid is water, water preferably is introduced at a rate of 15 to 35 (57 to 132 liters) gallons per minute, more preferably at about 15 gallons (57 liters) per minute. The speed of flow out of the forward jet outlet 212 and side jet outlet 222 preferably ranges from 2.5 ft/sec to 6 ft/sec (0.76 m/sec to 1.8 m/sec) at 10 to 20 gallons (38 to 76 liters) per minute.

The fluid enters the inlet assembly 200 through a pipe 240 having an inside diameter of approximately 2 inches, the inside diameter is reduced to approximately 1 inch (2.5 cm) at pipe 250, and the fluid then flows out of forward jet outlet 212 and side jet outlet 222. The side jet 220 directs the incoming fluid in a counter-clockwise direction as viewed from the top of the tank 110 shown in FIG. 2. The forward jet 210 increases the turbulence of the fluid in the tank.

The fluid exits through the outflow assembly 300. Fluid flows into the outlet assembly through holes 360 and 380. After fluid enters holes 360 and 380, the fluid flows through pipe 350 and out tank outlet 130. Deflector 400 prevents material that may be in the fluid from clogging the holes 360 and 380 by deflecting the circulating fluid from the holes 360 and 380.

Figure 9:
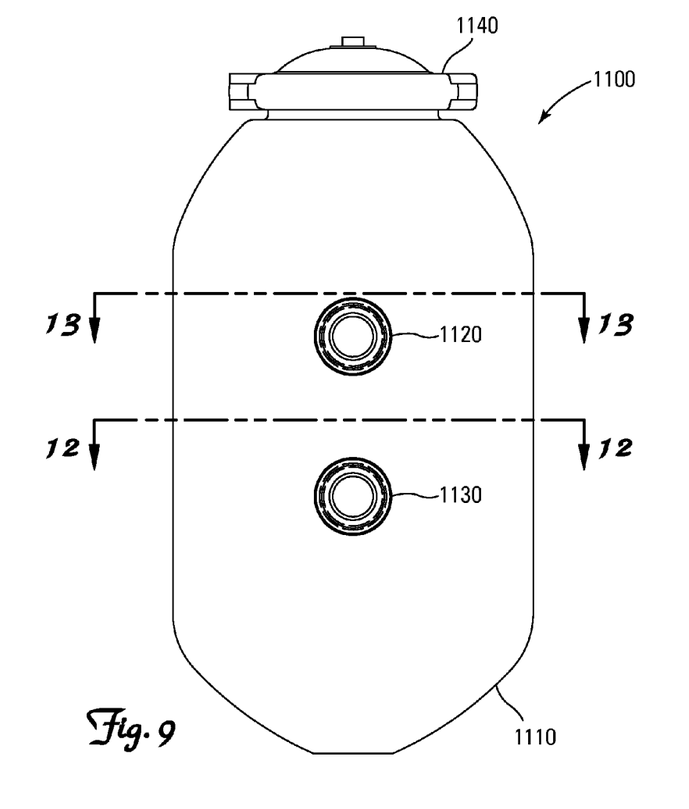
FIG. 9 is a front view of another embodiment of a turbulent flow device 1100 of the invention.

FIG. 9 shows another embodiment of a turbulent flow device 1100 of the invention. The device includes a tank 1110, tank inlet 1120, tank outlet 1130, and tank cover 1140. The tank cover 1140 includes a bleed assembly 1142. The bleed assembly 1142 is used to bleed air from the tank.

Figures 10, 11:
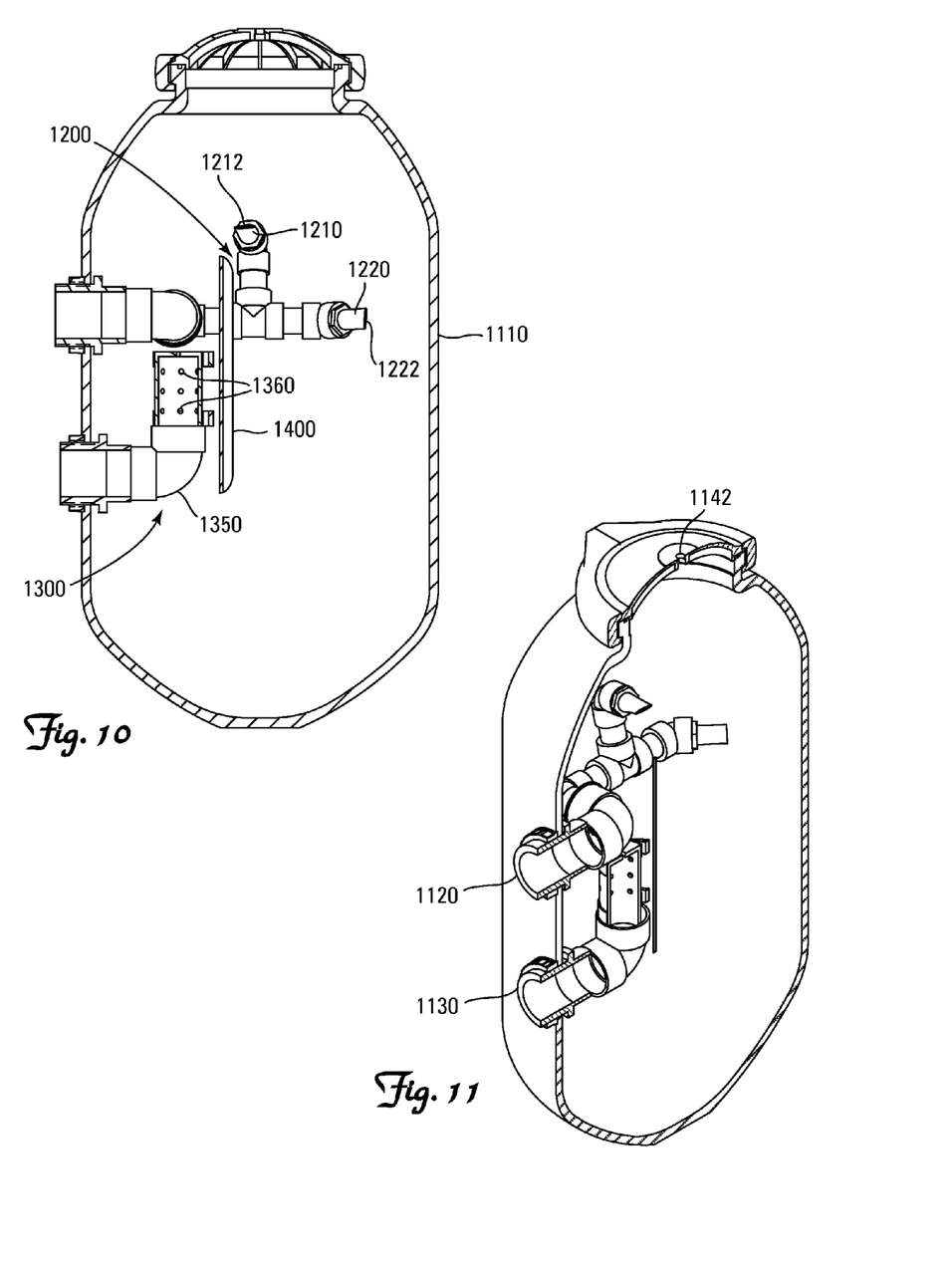
FIG. 10 is a side, cut-away view of the turbulent flow device 1100 of FIG. 9.
FIG. 11 is a perspective, cut-away view of the turbulent flow device 1100 of FIG. 9.
Figure 12:
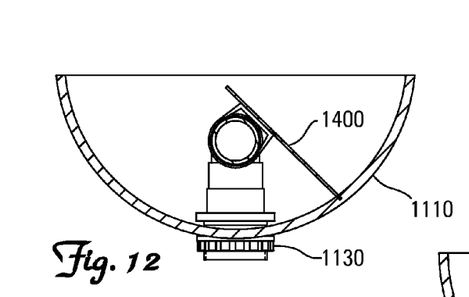
FIG. 12 is a cross-sectional view from line 12-12 of FIG. 9.
Figure 13:
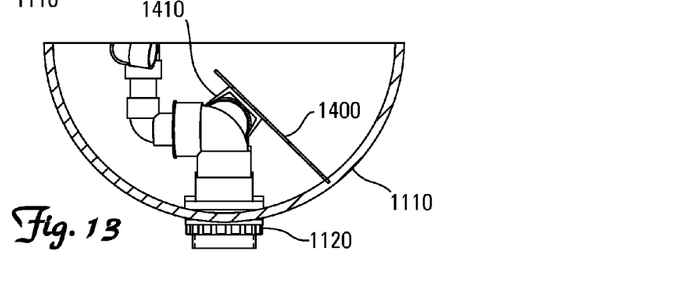
FIG. 13 is a cross-sectional view from line 13-13 of FIG. 9.

As shown in FIGS. 10 and 11, which are cut-away views of the turbulent flow device 1100 of FIG. 9, inflow assembly 1200 is connected to tank inlet 1120 and outflow assembly 1300 is attached to tank outlet 1130. Deflector 1400 is attached to the outflow assembly 1300 by deflector connection 1410. FIG. 12 is a cross-sectional view from line 12-12 of FIG. 9 and FIG. 13 is a cross-sectional view from line 13-13 of FIG. 9. As shown in the figures, deflector 1400 is a rectangular sheet that directs fluid past the outflow assembly 1300. The deflector 1400 is preferably made of plastic and the inlet and outflow assemblies are preferably made of plastic such as polyvinylchloride (PVC). The deflector 1400 could have rounded edges and corners.

The inflow assembly 1200 includes a jet 1210 and a jet 1220. The jet 1220 directs the incoming fluid in a clockwise direction as viewed from the top of the tank 1110 shown in FIG. 10. The jet 1210 increases the turbulence of the fluid in the tank. The inflow assembly 1200 is mounted to the tank 1110. The inflow assembly 1200 can be connected to the tank 1110 by adhesive or other methods. The fluid enters the inlet assembly 1200 through a pipe having an inside diameter of approximately 2 inches (5 cm), and the fluid flows out of jet outlet 1212 and jet outlet 1222.

The outflow assembly 1300 can be connected to the tank 1110 by adhesive or other methods. Fluid flows into the outlet assembly through holes 1360 on pipe 1350. Fluid also flows into the outlet assembly through hole 1380 on cap 1370 (not shown, similar to FIG. 8). After fluid enters holes 1360 and 1380, the fluid flows through pipe 1350 and out tank outlet 1130. Pipe 1350 has an inside diameter of approximately 2 inches (5 cm).

The deflector 1400 is attached to the outflow assembly by the deflector connection 1410. The deflector can be connected to the deflector connection by bolts, rivets, adhesives, or other methods.

Figure 14:
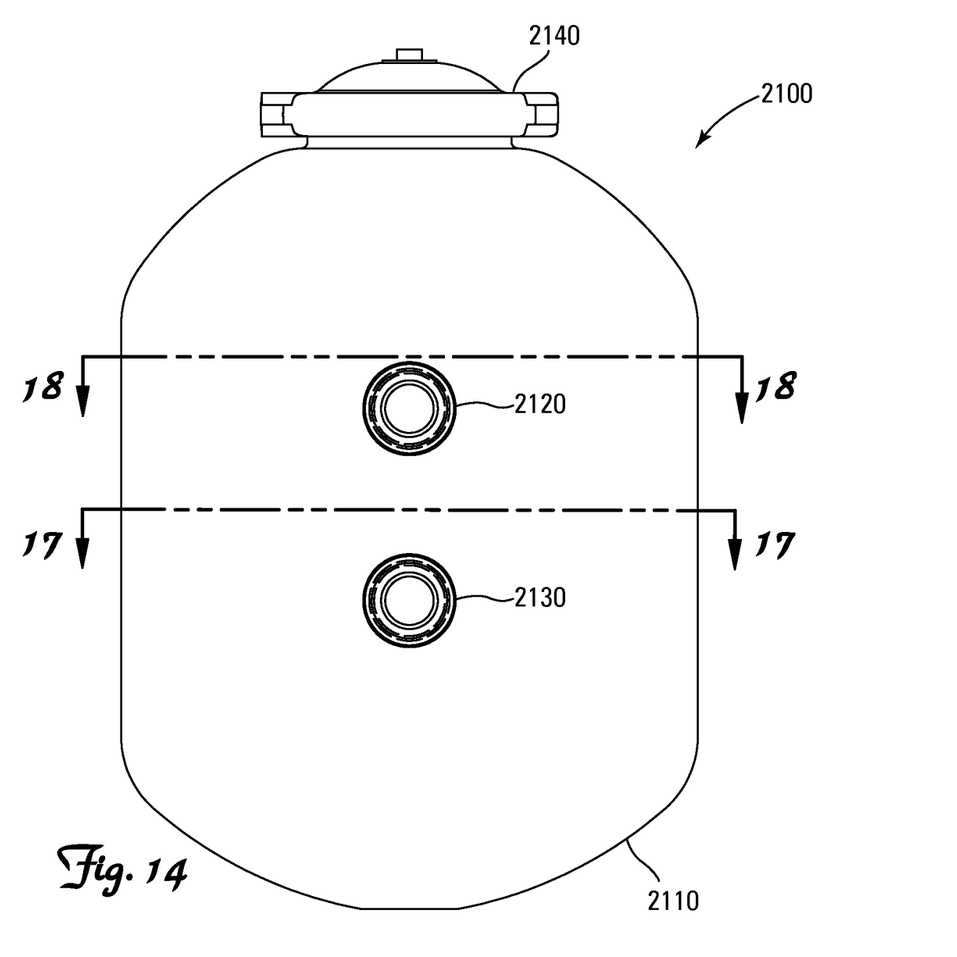
FIG. 14 is a front view of another embodiment of a turbulent flow device 2100 of the invention.

FIG. 14 shows another embodiment of a turbulent flow device 2100 of the invention. The device includes a tank 2110, tank inlet 2120, tank outlet 2130, and tank cover 2140. The tank cover 2140 includes a bleed assembly 2142. The bleed assembly 2142 is used to bleed air from the tank.

Figure 15:
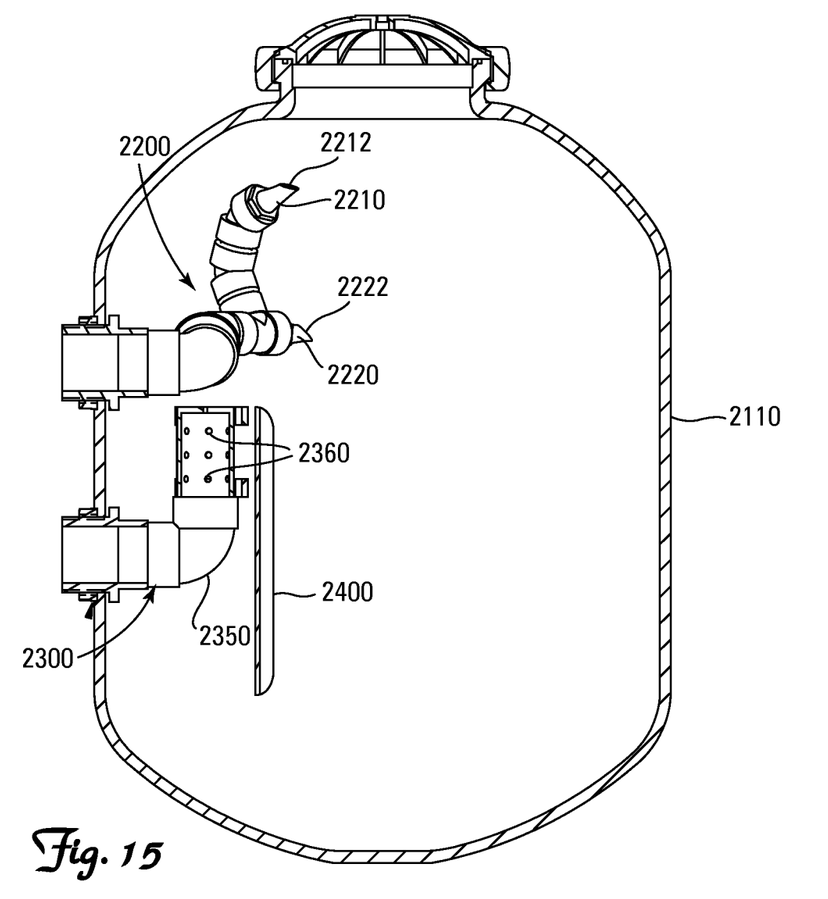
FIG. 15 is a side, cut-away view of the turbulent flow device 2100 of FIG. 14.
Figure 16:
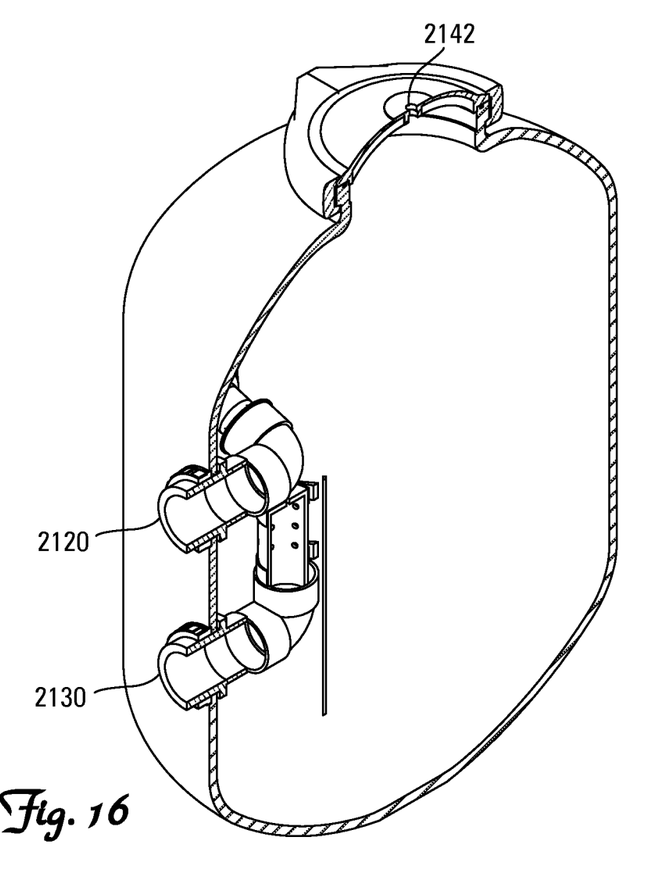
FIG. 16 is a perspective, cut-away view of the turbulent flow device 2100 of FIG. 14.

As shown in FIGS. 15 and 16, which are cut-away views of the turbulent flow device 2100 of FIG. 14, inflow assembly 2200 is connected to tank inlet 2120 and outflow assembly 2300 is attached to tank outlet 2130. Deflector

Figure 17:
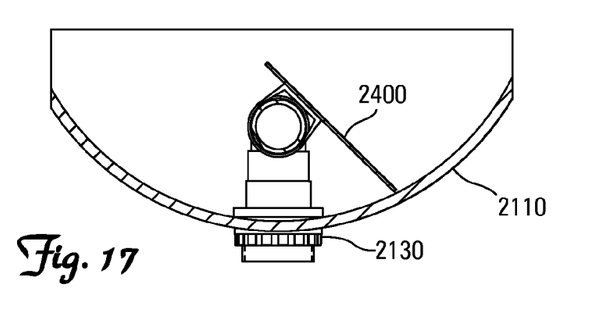
FIG. 17 is a cross-sectional view from line 17-17 of FIG. 14.
Figure 18:
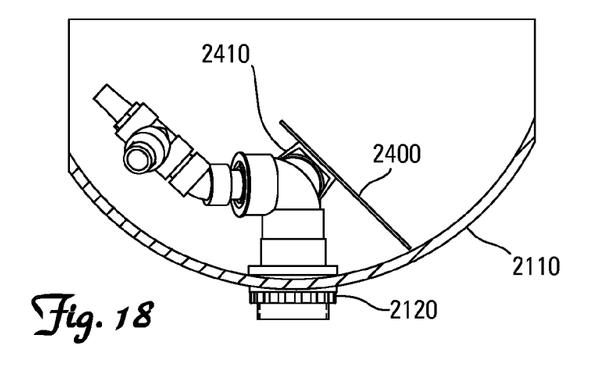
FIG. 18 is a cross-sectional view from line 18-18 of FIG. 14.

2400 is attached to the outflow assembly 2300 by deflector connection 2410. FIG. 17 is a cross-sectional view from line 17-17 of FIG. 14 and FIG. 18 is a cross-sectional view from line 18-18 of FIG. 14. As shown in the figures, deflector 2400 is a rectangular sheet that directs fluid past the outflow assembly 2300. The deflector 2400 is preferably made of plastic and the inlet and outflow assemblies are preferably made of plastic such as polyvinylchloride (PVC). The deflector 2400 could have rounded edges and corners.

The inflow assembly 2200 includes a jet 2210 and a jet 2220. The jet 2220 directs the incoming fluid in a clockwise direction as viewed from the top of the tank 2110 shown in FIG. 15. The jet 2210 increases the turbulence of the fluid in the tank. The inflow assembly 2200 is mounted to the tank 2110. The inflow assembly 2200 can be connected to the tank 2110 by adhesive or other methods. The fluid enters the inlet assembly 2200 through a pipe having an inside diameter of approximately 2 inches (5 cm), and the fluid flows out of jet outlet 2212 and jet outlet 2222.

The outflow assembly 2300 can be connected to the tank 2110 by adhesive or other methods. Fluid flows into the outlet assembly through holes 2360 on pipe 2350. Fluid also flows into the outlet assembly through hole 2380 on cap 2370 (not shown, similar to FIG. 8). After fluid enters holes 2360 and 2380, the fluid flows through pipe 2350 and out tank outlet 2130. Pipe 2350 has an inside diameter of approximately 2 inches (5 cm).

The deflector 2400 is attached to the outflow assembly by the deflector connection 2410. The deflector can be connected to the deflector connection by bolts, rivets, adhesives, or other methods.

Figure 19:
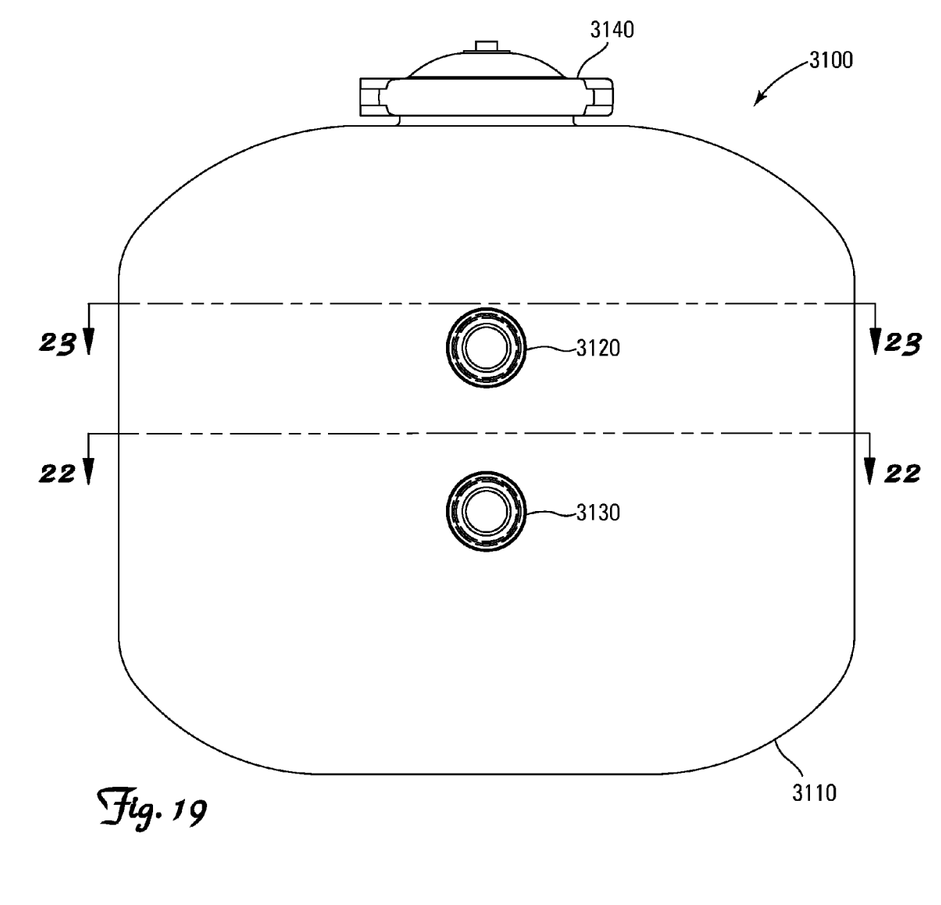
FIG. 19 is a front view of another embodiment of a turbulent flow device 3100 of the invention.

FIG. 19 shows another embodiment of a turbulent flow device 3100 of the invention. The device includes a tank 3110, tank inlet 3120, tank outlet 3130, and tank cover 3140. The tank cover 3140 includes a bleed assembly 3142. The bleed assembly 3142 is used to bleed air from the tank.

Figure 20:
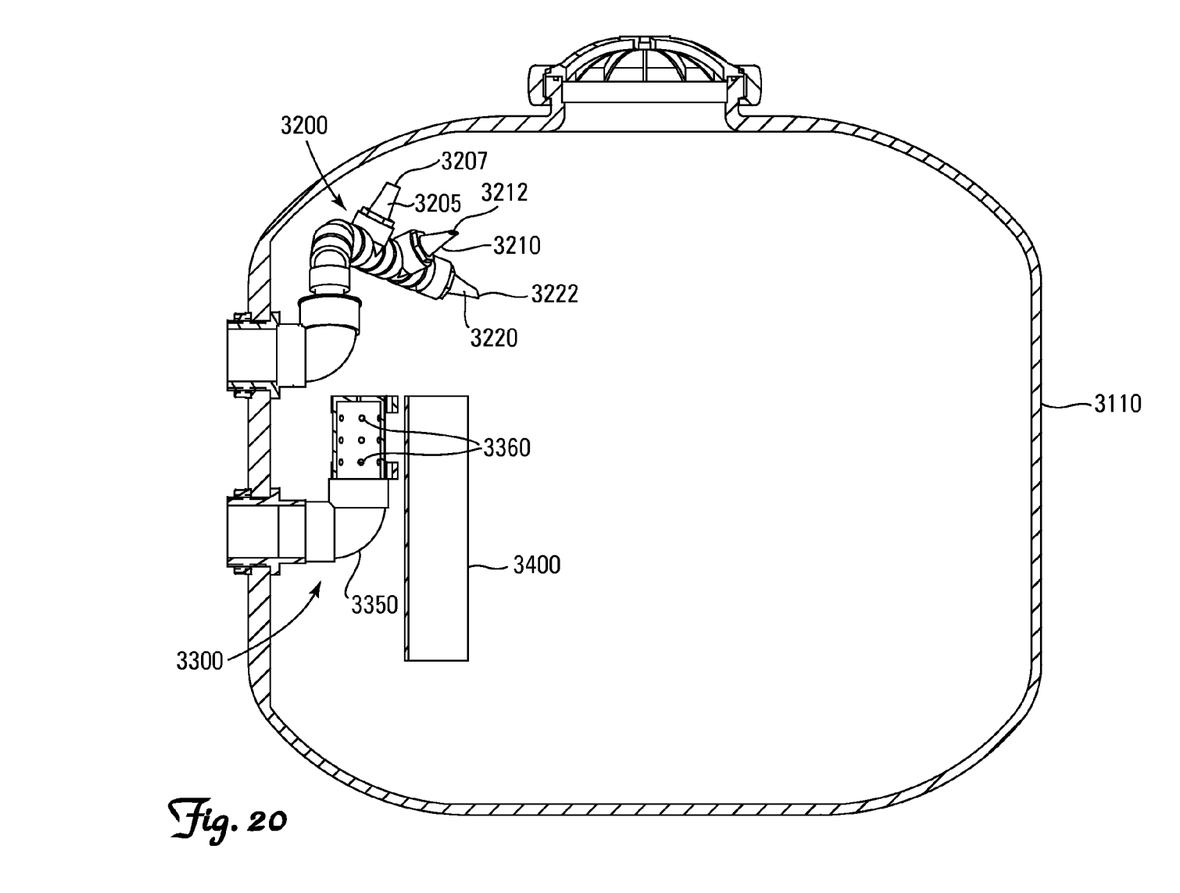
FIG. 20 is a side, cut-away view of the turbulent flow device 3100 of FIG. 19.
Figure 21:
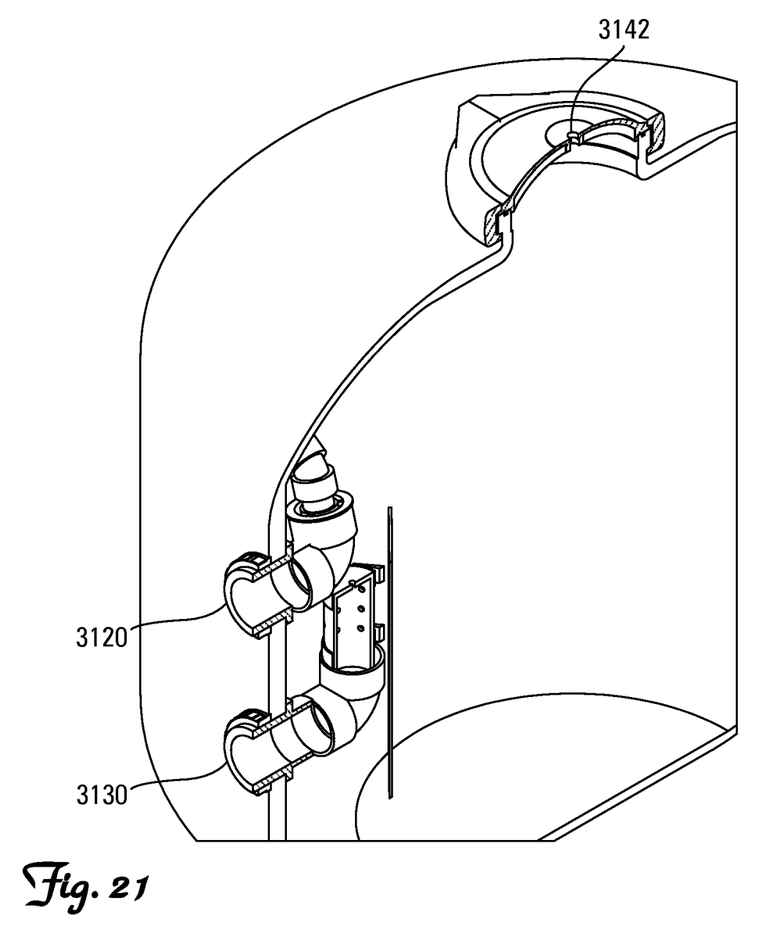
FIG. 21 is a perspective, cut-away view of the turbulent flow device 3100 of FIG. 19.
Figure 22:
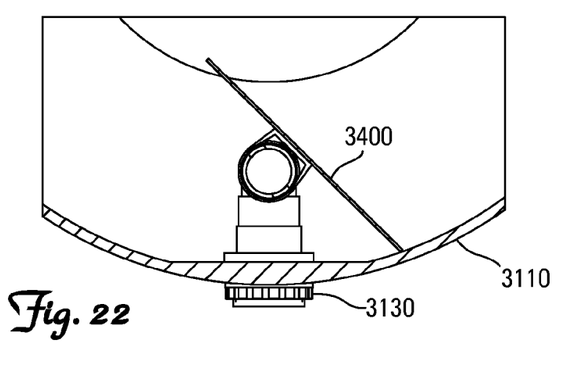
FIG. 22 is a cross-sectional view from line 22-22 of FIG. 19.
Figure 23:
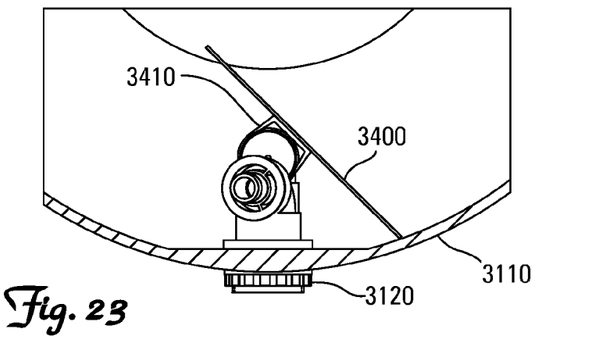
FIG. 23 is a cross-sectional view from line 23-23 of FIG. 19.

As shown in FIGS. 20 and 21, which are cut-away views of the turbulent flow device 3100 of FIG. 19, inflow assembly 3200 is connected to tank inlet 3120 and outflow assembly 3300 is attached to tank outlet 3130. Deflector 3400 is attached to the outflow assembly 3300 by deflector connection 3410. FIG. 22 is a cross-sectional view from line 22-22 of FIG. 19 and FIG. 23 is a cross-sectional view from line 23-23 of FIG. 19. As shown in the figures, deflector 3400 is a rectangular sheet that directs fluid past the outflow assembly 3300. The deflector 3400 is preferably made of plastic and the inlet and outflow assemblies are preferably made of plastic such as polyvinylchloride (PVC). The deflector 3400 could have rounded edges and corners.

The inflow assembly 3200 includes a jet 3210, a jet 3220, and a jet 3205. The jets 3220 and 3210 direct the incoming fluid in a clockwise direction as viewed from the top of the tank 3110 shown in FIG. 20. The jet 3205 increases the turbulence of the fluid in the tank. The inflow assembly 3200 is mounted to the tank 3110. The inflow assembly 3200 can be connected to the tank 3110 by adhesive or other methods. The fluid enters the inlet assembly 3200 through a pipe having an inside diameter of approximately 2 inches (5 cm), and the fluid flows out of jet outlet 3212, jet outlet 3222, and jet outlet 3207.

The outflow assembly 3300 can be connected to the tank 3110 by adhesive or other methods. Fluid flows into the outlet assembly through holes 3360 on pipe 3350.

Fluid also flows into the outlet assembly through hole 3380 on cap 3370 (not shown, similar to FIG. 8). After fluid enters holes 3360 and 3380, the fluid flows through pipe 3350 and out tank outlet 3130. Pipe 3350 has an inside diameter of approximately 2 inches (5 cm).

The deflector 3400 is attached to the outflow assembly by the deflector connection 3410. The deflector can be connected to the deflector connection by bolts, rivets, adhesives, or other methods.

In a preferred embodiment, the turbulent flow device 100 is used to increase the efficiency of contact between moss and water. The moss is contacted with the water for the purposes described above, especially in the background of the invention. If the turbulent flow device 100 is used to contact water in a home water system a single bag of moss can be used in the device. If the device 100 is used to contact water in a pool system, more bags can be used, for example 8 to 12 bags. Preferably, each bag of moss is made of nylon mesh and contains three 50 g bricks. The moss was obtained from Coastpak Holdings, Ltd., Hokitika, New Zealand.

Deflector 400 prevents the moss bags and any moss that may escape from the bags from clogging the holes 360 in the outflow assembly 300. The moss is naturally buoyant so it tends to stay in suspension. The water circulation should be maintained at a high enough velocity for the bags to get by the suction of the outflow holes 360 and maintain circulation of the bags in the vessel. Turbulent flow devices 1100, 2100, and 3100 can be used in a similar manner to turbulent flow device 100.

In an embodiment, the moss is non-decomposed moss and is selected from the group consisting of Sphagnum papillosum, Sphagnum cristatum, and mixtures thereof.

In preferred embodiments, the moss is enclosed or encapsulated in a mesh material that prevents the moss from disintegrating in an aqueous environment. Preferred mesh materials include those comprising polymers such as nylon or polypropylene, with mesh sizes ranging from about 0.1 to 1 mm. Polymers are generally preferred because they are inexpensive and may be resistant to degradation.

Suitable for use in this invention are Sphagnum papillosum, which can be harvested from bogs in northern Minnesota, U.S.A., and Sphagnum cristatum, which is commercially available as a compressed board from Coastpak Holdings, Ltd., Hokitika, New Zealand and from Super-Sphag Ltd, Totara Flat, New Zealand. These species of moss can be used by themselves or together in the devices and systems of this invention. Typically and preferably the moss is cleaned to remove small particles, such as dirt, and larger debris, such as roots and leaves. Commercially available moss may be fumigated before it is packaged by a manufacturer in order to destroy seeds.

In a preferred embodiment, the moss is cut by mechanical means into a desired size and shape. The moss preferably is then sterilized by autoclaving, exposure to ethylene oxide, or by other means known to one of skill in the art. Sterilization destroys living organisms in the moss and thus avoids any problems of undesirable or foreign bacteria being introduced into the environment where a device of this invention is used. The moss is then ready for use.

The moss can be compressed and can be in the form of strips or bricks. The moss can be sterilized by autoclaving, sterilized by chemical treatment, or sterilized by treatment with ethylene oxide. The moss can be washed with an acidic solution, especially a solution of acetic acid. The moss can be washed with an acidic solution and then washed with a salt solution.

The devices 100, 1100, 2100, and 3100 can be used to contact any fluid with any material to add or remove substances from the fluid of from the material.

The above description and the drawing are provided for the purpose of describing embodiments of the invention and are not intended to limit the scope of the invention in any way. It will be apparent to those skilled in the art that various modifications and variations can be made without departing from the spirit or scope of the invention. Thus, it is intended that the present invention cover the modifications and variations of this invention provided they come within the scope of the appended claims and their equivalents.

What is claimed is:

1. A method of contacting moss with water and producing turbulent flow in the water comprising:
   providing a device for creating turbulent flow in a fluid comprising: a tank having an inlet, an outlet, and an interior; at least one jet in an inflow assembly in the interior of the tank, the jet being in fluid communication with the inlet, the jet circulating fluid in the tank; a plurality of holes in an outflow assembly in the interior of the tank, the plurality of holes being in fluid communication with the outlet; and a deflector positioned to circulate a bulk of the fluid away from the plurality of holes, the inflow assembly comprising a first jet and a second jet, and the tank having a top portion and a side portion and the first jet being pointed at the top portion and the second jet being pointed at the side portion,
   placing moss in the interior of the tank,
   pumping water into the inlet at a rate sufficient to produce turbulent flow in the water in the interior of the tank, and
   allowing water to flow out the outlet.

2. The method of claim 1, wherein the deflector is a curved rectangular sheet with dimensions of from 8 to 16 inches by 8 to 16 inches by ⅛ to ½ inch.

3. The method of claim 1, wherein water is pumped into the inlet at a rate of 15 to 35 gallons per minute.

4. The method of claim 1, wherein the tank has a volume of 50 to 100 gallons.

5. The method of claim 1, wherein the moss is in one or more mesh bags.

6. The method of claim 1, wherein the first and second jets are oriented at a right angle to each other.

7. The method of claim 1, wherein the inlet is positioned above the outlet.

8. The method of claim 1, wherein the deflector is attached to the outlet assembly.

9. The method of claim 1, wherein the moss is regenerated by flowing an acidic or salt solution through the device.

* * * * *